United States Patent [19]

Kenkel

[11] 4,377,970

[45] Mar. 29, 1983

[54] NUT CRACKER

[76] Inventor: Michael I. Kenkel, 5526 South Mason, Chicago, Ill. 60638

[21] Appl. No.: 286,259

[22] Filed: Jul. 23, 1981

Related U.S. Application Data

[63] Continuation of Ser. No. 113,140, Jan. 17, 1980, abandoned.

[51] Int. Cl.³ .............................................. A23N 5/00
[52] U.S. Cl. ....................................... 99/572; 99/579; 99/582
[58] Field of Search .......................... 99/568, 571-573, 99/579-583; 30/120.1-120.5

[56] References Cited

U.S. PATENT DOCUMENTS

| | | | |
|---|---|---|---|
| 1,087,617 | 2/1914 | Traber | 99/583 |
| 2,285,355 | 6/1942 | Pricer | 99/581 |
| 2,703,522 | 3/1955 | Smith | 99/581 |
| 2,827,087 | 3/1958 | Connor | 99/579 |
| 3,578,047 | 5/1971 | Diggs | 99/572 |
| 3,713,468 | 1/1973 | Walsh | 99/580 |

Primary Examiner—Philip R. Coe
Assistant Examiner—Timothy F. Simone
Attorney, Agent, or Firm—Hill, Van Santen, Steadman, Chiara & Simpson

[57] ABSTRACT

A nut cracker includes a base that supports an adjustably fixed anvil member and a moveable ram member under the control of a handle, there being a guide interconnecting the ram member with the base which maintains the ram member in an erect position. The confronting faces of the anvil member 17 and the ram member 27 are provided with recesses into which the ends of the nut are received with clearance so that the outer rim of such recesses engage the nut to provide the cracking force to its shell remotely from the ends of the nut. With this construction, a heavy-duty unit is provided which is especially useful for cracking nuts that have hard or strong shells such as black walnuts and butternuts, and the construction further enables the shells to be broken and nut meats recovered in larger pieces without overcracking.

5 Claims, 3 Drawing Figures

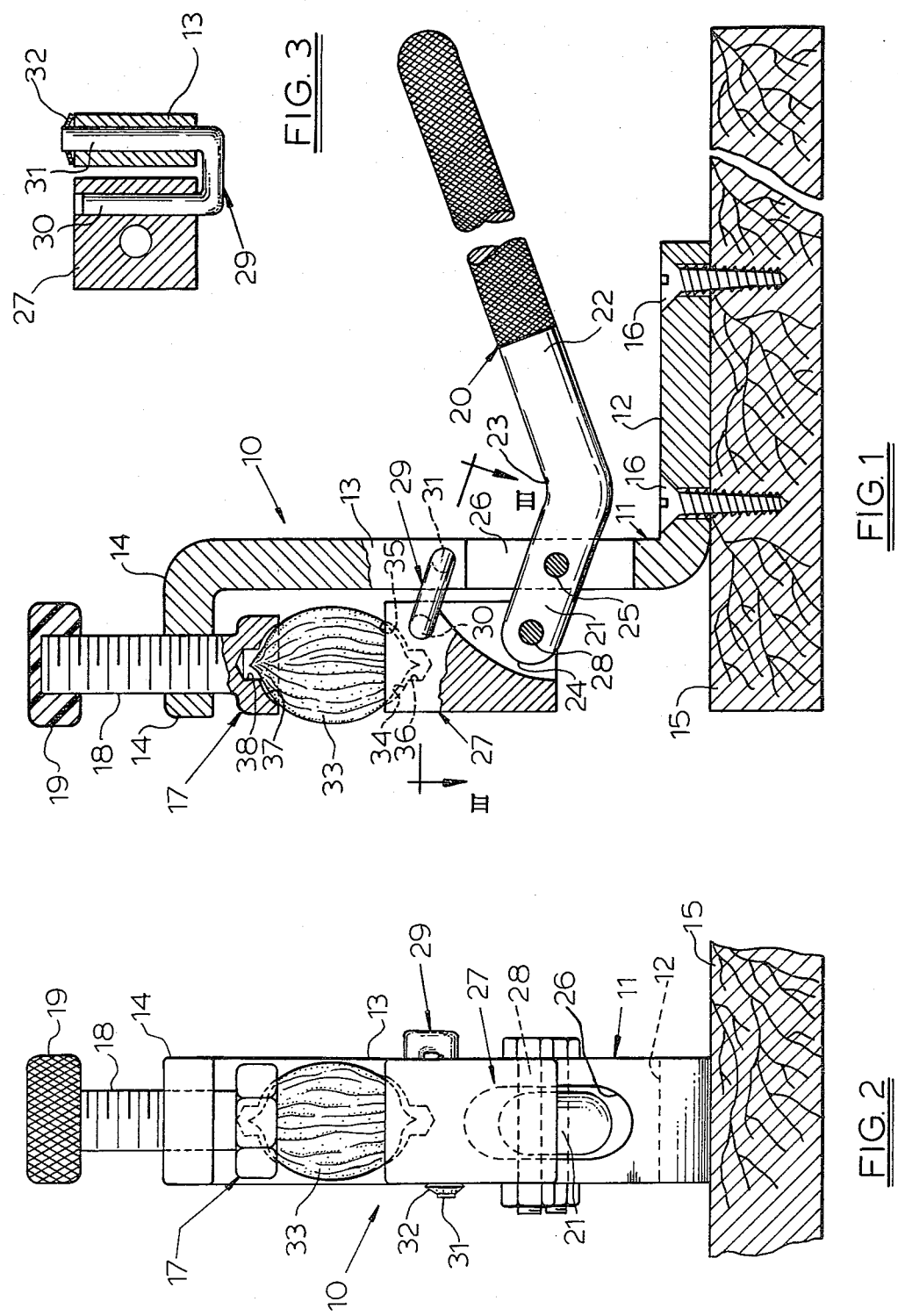

NUT CRACKER

This is a continuation of application Ser. No. 113,140, filed Jan. 17, 1980, abandoned.

BACKGROUND OF THE INVENTION

1. Field of the Invention

This invention relates to a nut cracker.

2. Prior Art

Typical nut crackers that are used in the home have given the users certain problems especially where the shell is very hard, because the user cannot exert sufficient force on the shell, and because the shell is not contacted properly to cause the shell to break into a few large pieces, rather than into many small pieces, which break and lock the nut meat into the small pieces, thus requiring hand-picking to remove the meat. If a person uses a hammer on a nut supported on a hard surface, such damage occurs to the nut meat. On the other hand, if a conventional pair of levers that act as a second class lever are used, such a nut cracker has its effectiveness limited by the size and strength of a person's hand grip. Usually one hand grips the nut cracker and the other positions the nut in the nut cracker.

SUMMARY OF THE INVENTION

The present invention is directed to a nut cracker which is supported on a base and operated by a single hand. It includes an adjustable cup-shaped anvil member and a cup-shaped ram member, the latter being movable toward and away from the anvil member in response to the pivoting of an elongated handle which is connected thereto as a first class lever with a substantial mechanical advantage. A guide keeps the ram member directed toward the anvil member during movement.

Accordingly, it is an object of the present invention to provide a nut cracker which facilitates the cracking of hard, difficult-to-crack nuts.

Another object of the invention is to provide a nut cracker wherein the nut-cracking force can be readily controlled so as to avoid over-cracking.

Yet another object of the present invention is to provide a nut cracker which optimizes the points on the shell of the nut where the cracking force is applied.

Still another object of the present invention is to provide a nut cracker which, in use, provides an improved recovery of the larger nut meats from fewer and larger cracked shell pieces.

Yet another object of the present invention is to provide a nut cracker which has the capacity to accommodate a wide range of sizes of nut.

A further object of the present invention is to provide a nut breaker which can be used rapidly so that more nuts per unit time can be cracked.

A still further object of the present invention is to provide a construction for a nut cracker which is rugged, which can withstand considerable abuse, and which is virtually free of any need for maintenance.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWINGS

FIG. 1 is a side elevational view, with parts broken away, of a nut cracker constructed in accordance with the present invention;

FIG. 2 is a front elevational view thereof taken from the left side of FIG. 1; and FIG. 3 is a fragmentary cross-sectional view taken along line III—III of FIG. 1.

AS SHOWN ON THE DRAWINGS

A nut cracker constructed in accordance with the present invention is illustrated in FIG. 1, generally indicated by the numeral 10. The nut cracker 10 includes a base 11 having a lower portion 12, an upright intermediate portion 13, and an upper portion 14 which extends transversely to the upright intermediate portion 13. The lower portion 12 and the upper portion 14 are parallel to each other, and the lower portion 12 is so directed and is so provided with apertures that it is adapted to be secured to a support 15 by a number of screws 16.

The nut cracker 10 further includes an anvil member 17 which is adjustably secured to the upper portion 14 of the base 11 by a set of screw threads or threaded portion 18 mating with corresponding threads in the base 11, the upper projecting end of the anvil 17 having a knob 19 corotatably secured thereto.

An elongated handle 20 has a short portion 21 and a long portion 22, several times longer, the handle portions 21,22 being disposed at an obtuse angle 23 with respect to each other. The handle 20 is pivoted near one end 24 in the short portion 21 to the intermediate portion 13 of the base 11 at a point remote from the upper portion 14 by a nut and bolt set 25, the short portion 21 extending through a vertically elongated aperture 26 in the intermediate portion 13 of the base 11.

The nut cracker 10 further includes a ram member 27 which is pivoted to the handle 20 at said one end 24 by a further nut and bolt set 28.

The nut cracker 10 further includes a guide 29 which here comprises a rigid U-shaped element which has a pair of legs 30,31 which are respectively pivotally received in the ram member 27 and the intermediate portion 13 of the base 11. The pivotal axis of the leg 30 is vertically spaced from the pivotal axis of the nut and bolt set 28 by a distance which is equal to the spacing between the pivotal axis of the leg 31 and the nut and bolt set 25. Thus the pivotal connections of the guide 29 are spaced equidistantly from the pivotal connections on the handle 20. As best shown in FIG. 3, one of the legs 31 is made longer than the other leg 30 so that it projects through the portion 13 of the base 11, the projecting portion having thereon a fastener 32 of a commercial type formed as a washer with internal teeth.

The short portion 21 of the handle 20 has both of the pivotal connections formed by the nut and bolt sets 25,28, and the closeness of these nut and bolt sets 25,28 to each other compared to the total length of the handle 20 provides a great mechanical advantage, the handle 20 typically having a total length of 24 inches.

An important feature of the nut cracker 10 is the fact that the anvil member 17 and the ram member 27 are each provided with confronting configurations which enable the cracking force to be applied to a nut 33 remotely from its ends. The ram member 27 has a first recess 34 which has a radius of curvature which is less than that of the end of a typical nut so that there is defined a circular rim 35 or edge by which the force is actually transmitted to the nut 33. In order for the nut cracker 10 to accommodate both black walnuts and butternuts, a second recess 36 of cylindrical form is provided which extends deeper into the member 27 from the bottom of the first recess 34. As shown in FIG. 1, the second recess 36 accommodates a pointed end of the nut without engaging it so that the cracking force is applied by the rim 35 remotely from the end of the nut no matter what the shape of the end of the nut is.

The anvil member 17 has a pair of recesses 37,38 which correspond to the recesses 34,36 in configuration. The recesses 36,38 could be omitted if the use of the nut cracker were to be restricted to nuts having non-pointed ends. Also, one of the recesses 36,38 could be omitted if the use of the nut cracker were to be restricted to nuts having only one pointed end. However, it is preferred even in this instance that both recesses 36,38 be provided so that the user does not need to associate the single pointed end of the nut with a particular one of the members 17,27.

By virtue of the rugged construction, the good mechanical advantage and the anchoring of the nut cracker 10, a heavy duty device is provided which, in use, cracks the nut shells in such a way as to give larger nut pieces, thus eliminating most of the tedious manual picking. Proper engagement with the shell is thus an important feature of the nut cracker 10. One hand can be used to place the nut between the anvil member 17 and the ram member 27 while the other hand can be used to actuate the lever 20. Neither hand supports the nut cracker. The cracking force is applied to the nut in a direction parallel to its longitudinal axis and the force is not applied to either end of the nut. During travel of the ram member 27, the axis of the recess or cup 34 is maintained in parallelism to its direction of travel, an aspect which is important for efficient cracking to produce large pieces of nut meat.

The adjustability of the position of the anvil member 17 enables nuts having a wide range of nut length to be cracked. As the travel of the ram member 17 is along an arcuate path, it therefore has a small vector of movement in a horizontal direction. By a proper positioning of the anvil member 17 for a given length of nut, a setting can be provided wherein the axes of the recesses 34,37 are substantially in line with each other. Such adjustment optimizes the obtaining of large pieces of nut meat. The amount of vertical movement of the lower cup between the point of engagement with the nut and its position when the nut shell cracks is actually rather small, about ⅛ inch. With the relatively long handle, such small movement of the ram member 27 can be accurately controlled and thus over-cracking is avoided. Further, the relatively large mass of the handle and the ram member 27 compared to the mass of the nut substantially eliminates any spring back from the nut during cracking.

Although various minor modifications may be suggested by those versed in the art, it should be understood that I wish to embody within the scope of the patent warranted hereon, all such embodiments as reasonably come within the scope of my contribution to the art.

I claim as my invention:

1. A nut cracker, comprising:
   (a) a base having a lowermost portion adapted to be secured to a support, a vertical intermediate portion, and an uppermost horizontal portion vertically spaced from said lowermost portion by said intermediate portion and extending transversely to said intermediate portion and having a vertical bore;
   (b) a vertically adjustable anvil member secured to said uppermost portion of said base in said bore, and disposed at one side of and horizontally spaced from said vertical intermediate portion;
   (c) an elongated handle having a pivotal connection near but spaced from one of its ends with said vertical intermediate portion of said base at a first fixed axis disposed remotely from said uppermost portion of said base and having a gripping portion disposed at the side of said vertical intermediate portion opposite to said one side where said anvil member is disposed;
   (d) a ram member having a direct pivotal support and drive connection with said one end of said handle for movement about a first displaceable axis, and said ram member being disposed at the side of said vertical intermediate portion which is opposite to the side where said gripping portion is disposed, said ram member being horizontally spaced from said vertical intermediate portion; and
   (e) a guide pivoted at one point about a second fixed axis on said intermediate portion of said base, and pivoted at a second point to said ram member for movement about a second displaceable axis, said movable axes on said ram being vertically spaced the same distance as said fixed axes on said vertical intermediate portion are spaced.

2. A nut cracker according to claim 1, said vertical intermediate portion of said base having a vertically elongated aperture within which said handle is pivotably disposed, and through which said first fixed axis extends.

3. A nut cracker according to claim 1, said lowermost and said uppermost portions of said base being parallel to each other, and extending in opposite horizontal directions from said intermediate portion, whereby said anvil and said ram are disposed at the side of said intermediate portion opposite to said lowermost portion of said base.

4. A nut cracker according to claim 1, said guide being rigid and U-shaped, the U-shape having legs extending along said second fixed and said second displaceable axes remotely from said handle.

5. A nut cracker according to claim 4, only one of said guide legs projecting through, and a single fastener secured to said one guide leg.

* * * * *